(12) United States Patent
Nagaraj

(10) Patent No.: US 6,321,175 B1
(45) Date of Patent: Nov. 20, 2001

(54) THERMAL SENSING OF MULTIPLE INTEGRATED CIRCUITS

(75) Inventor: Ravi Nagaraj, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/217,678

(22) Filed: Dec. 21, 1998

(51) Int. Cl.[7] .................................................. G01K 13/00
(52) U.S. Cl. ...................... 702/132; 374/152; 713/300; 257/467
(58) Field of Search ............................. 702/132; 374/141, 374/152; 713/300, 322; 257/467

(56) References Cited

U.S. PATENT DOCUMENTS

| 5,281,026 | * | 1/1994 | Bartilson et al. | 374/143 |
|---|---|---|---|---|
| 5,623,594 | * | 4/1997 | Swamy | 395/180 |
| 5,713,030 | * | 1/1998 | Evoy | 395/750 |
| 5,805,403 | * | 9/1998 | Chemla | 361/103 |
| 5,838,578 | * | 11/1998 | Pippin | 364/488 |
| 5,940,786 | * | 8/1999 | Steeby | 702/132 |
| 5,961,215 | * | 10/1999 | Lee et al. | 374/178 |
| 5,991,156 | * | 11/1999 | Bond et al. | 361/707 |
| 6,008,536 | * | 12/1999 | Mertol | 257/704 |
| 6,058,012 | * | 5/2000 | Cooper et al. | 361/704 |
| 6,091,255 | * | 7/2000 | Godfrey | 324/760 |
| 6,140,860 | * | 10/2000 | Sandhu et al. | 327/513 |
| 6,196,002 | * | 3/2001 | Newman et al. | 62/3.7 |
| 6,203,191 | * | 3/2001 | Mongan | 374/43 |

* cited by examiner

*Primary Examiner*—Patrick Assouad
(74) *Attorney, Agent, or Firm*—Kenyon & Kenyon

(57) ABSTRACT

A thermal sensing system allowing the measurement of the temperature of multiple integrated circuit devices using a single thermal sensor. The thermal sensor is positioned proximally to a first integrated circuit device to obtain ambient temperature readings from the device. The thermal sensor also includes remote sensing capability to measure the temperature of a second integrated circuit device positioned away from the thermal sensor. The thermal sensing system may be used to monitor a microprocessor module for an overheat condition and respond accordingly.

20 Claims, 4 Drawing Sheets

THERMAL SENSING OF MULTIPLE INTEGRATED CIRCUITS

BACKGROUND INFORMATION

Integrated circuit devices comprise many circuit elements arranged compactly in a single physical structure (a "chip"). When operating, these chips tend to generate heat in the course of processing electrical signals. The amount of heat generated by an integrated circuit is dependent on several factors, including the density of circuit elements on the chip, the signal switching speed and the signal power. Chips used in, for example, computers and embedded systems, are likely to generate large amounts of heat, because such integrated circuits generally comprise a very large number of circuit elements arranged on a single chip and are generally operated at high signal switching speeds. Examples of such devices are central processing unit (CPU) chips (such as "microprocessors" or "coprocessors"), memory chips, system control chips (also known as "chipsets"), and others. Excessive heat can degrade performance of these devices, as well as result in permanent physical damage which may cause the chip to fail completely.

Microprocessors have been found to be particularly prone to overheating problems, as microprocessors generally comprise the highest densities of circuit elements and are operated at the highest switching speeds. As a result, microprocessors are typically used in conjunction with a "heat sink" or "cooling fan" to help dissipate the heat generated by the chip. Other integrated circuits have likewise been used in conjunction with heat sinks or cooling fans for similar purposes.

These heat dissipation steps, however, may not be sufficient to completely counteract the heat generated by the device, particularly as the density of circuit elements in integrated circuits and the speed at which integrated circuits are operated continues to increase. Furthermore, the ambient temperature of the surrounding environment may be such that the cooling measures implemented (such as heat sinks) are inadequate. In such instances, it is desirable to avoid catastrophic failure of the chip by taking more active measures, for example, by placing the device in a low power mode, reducing clock speed or shutting down the device completely. In previous systems, for example, microprocessors have been used in conjunction with thermal monitoring systems that cause certain actions to be taken (e.g., clock "throttling" or shut down) once a critical temperature has been sensed.

In the area of, for example, computer design, microprocessor "modules" have been developed that incorporate a microprocessor chip, cache memory chip(s) and system chipset chip(s) on a single printed circuit board. FIG. 1 illustrates a hypothetical arrangement of these components for such a microprocessor module. Printed circuit board 1 includes a microprocessor 2 with heat sink 6, a system chipset 3 (indicated by the dashed line) and one or more cache chips 4. The system chipset 3 comprises one or more integrated circuit chips including, for example, a system controller device 7. A thermal sensor 5 is provided adjacent to microprocessor 2. In particular, thermal sensor 5 is coupled to electrical ground connections for microprocessor 2, such that heat generated by microprocessor 2 may be sensed by thermal sensor 5 via an ambient heat sensing capability (see FIG. 2).

In previous designs, the non-microprocessor chips (the chipset 3 and the cache chips 4) were unlikely to experience heat problems. However, as the circuit density and speed of non-microprocessor chips have increased, and as non-microprocessor chips have been located in closer proximity to the microprocessor (particularly as part of a microprocessor module), these non-microprocessor chips have become prone to heat problems in a similar manner as the microprocessor 2. For example, as shown in FIG. 1, the system controller 7 of chipset 3 may be located in close proximity to microprocessor 2 on the microprocessor module, such that heat generated by microprocessor 2 becomes "coupled" to system controller 7 and contributes to the overall temperature of system controller 7.

Previous responses to similar heat problems in other "thermally critical" devices have been to implement a second thermal sensor proximate to the device. However, the use of an additional thermal sensor in the microprocessor module would not only increase the cost of the module, but also increase the complexity of the design, as multiple thermal sensors must now be controlled and located proximate to the devices to be sensed. Thus, there is a need to monitor the thermal characteristics of multiple integrated circuit chips in a simple and cost effective manner.

SUMMARY OF THE INVENTION

According to an exemplary embodiment of the present invention, a thermal sensing system is implemented, comprising a first integrated circuit device having a heat sensing element, a second integrated circuit device, and a thermal sensor. The thermal sensor is thermally coupled to the second integrated circuit device to measure the temperature of the second integrated circuit device. The sensor is also electrically coupled to the heat sensing element to measure the temperature of the first integrated circuit device.

DETAILED DESCRIPTION

An exemplary embodiment according to the present invention will now be described with reference to FIGS. 3–5, which depict an implementation of an exemplary microprocessor module in conjunction with an exemplary thermal sensing system. According to the present invention, a single thermal sensing device may be employed to detect the thermal characteristics of two integrated circuit devices, and thereby allow a thermal sensing system to provide instruction to counteract an "overheat" condition for one or both devices. The thermal sensing device is positioned to take advantage of its ambient temperature sensing capabilities via thermal coupling, as well as its remote temperature sensing capabilities via electrical connections, to provide temperature measurements of multiple devices.

Figure 1:
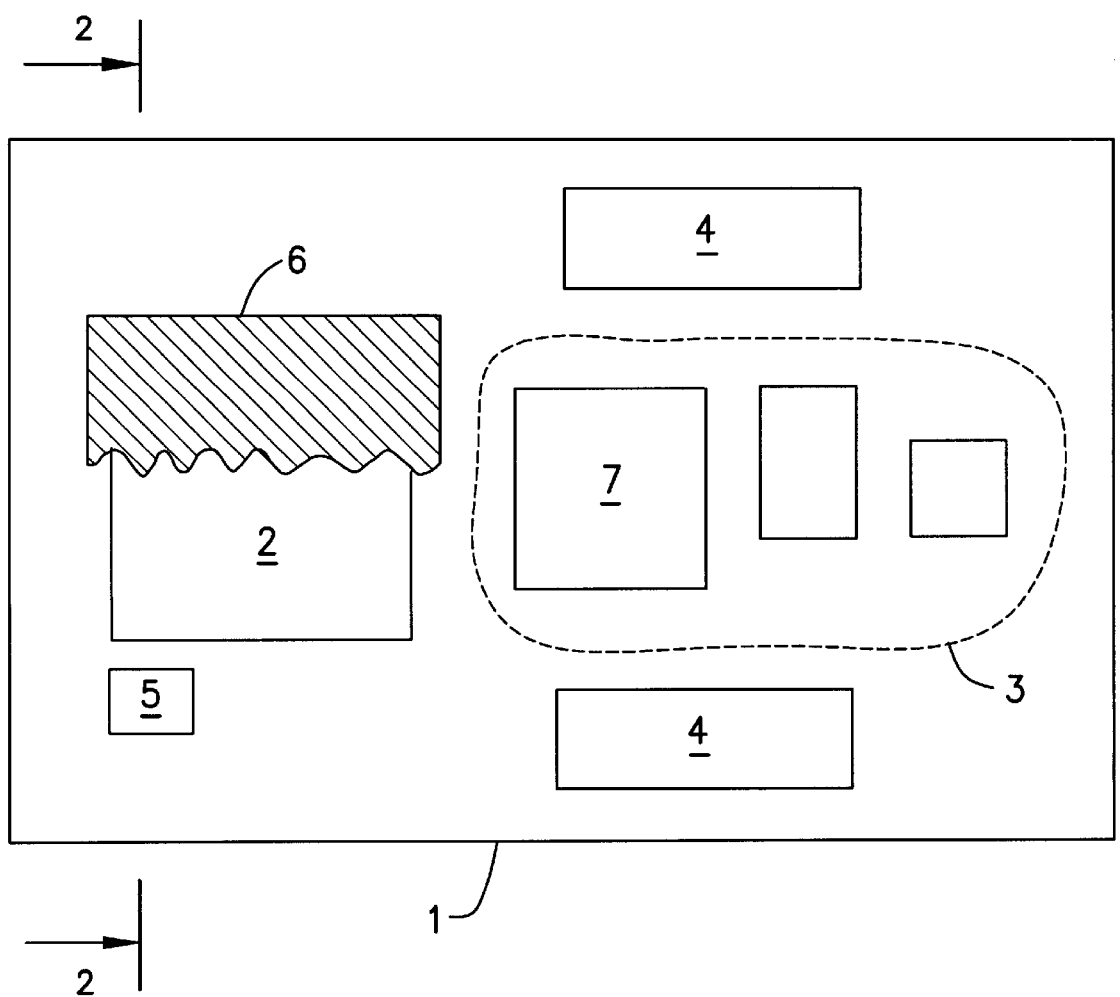
FIG. 1 shows a top side view of microprocessor module.
Figure 2:
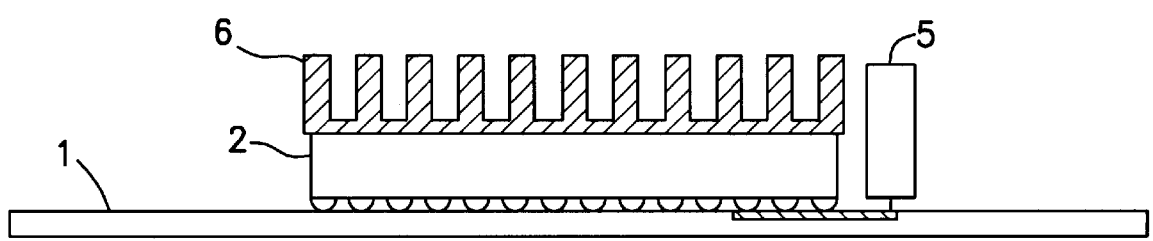
FIG. 2 shows a cross-sectional view of the microprocessor module of FIG. 1 along the line 2—2.
Figure 3:
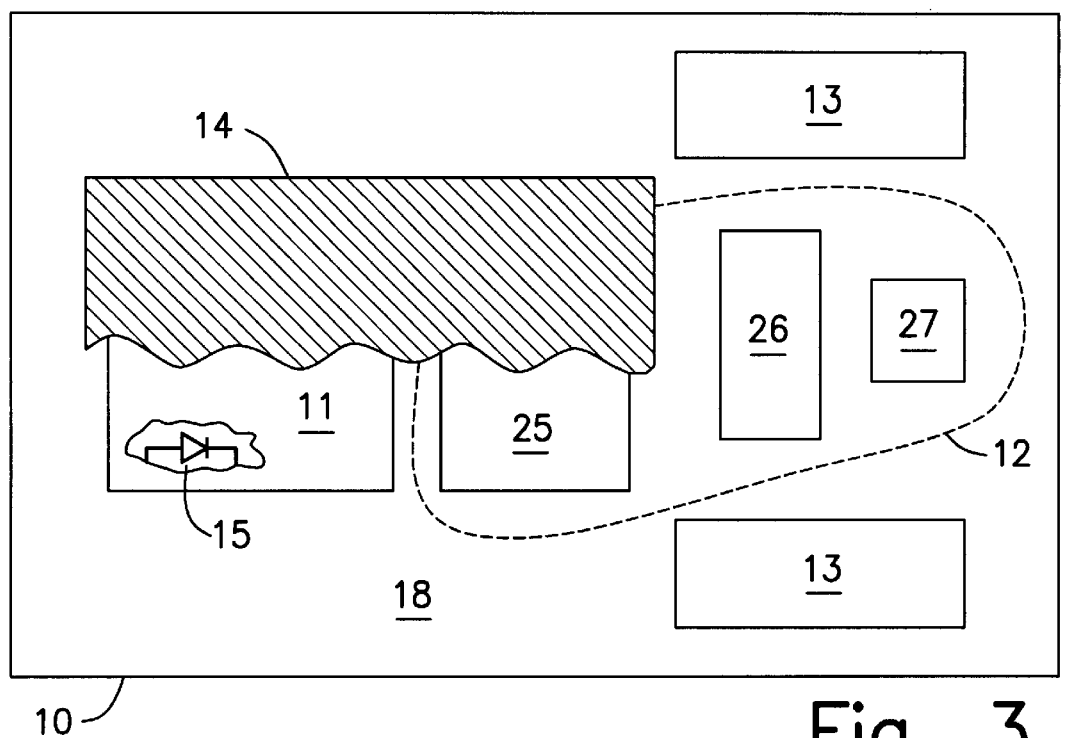
FIG. 3 shows a top side view of an exemplary microprocessor module according to the present invention.

FIG. 3 shows a top side view of an exemplary microprocessor module implementation according to the exemplary embodiment of the present invention. The exemplary embodiment according to the present invention may also be applicable to other circuit configurations; the exemplary microprocessor module described herein provides an example of one possible implementation according to the invention. As shown in FIG. 3, printed circuit board 10 is populated by a microprocessor integrated circuit device 11, a system chipset 12 (indicated by dashed lines), a number of cache memory chips 13 and a heat sink 14. System chipset 12 may comprise one or more integrated circuit chips; in the example shown in FIG. 3, system chipset 12 includes a system controller integrated circuit chip 25 and support chips 26, 27. Printed circuit board 10 may also comprise other electronic devices (resistors, capacitors, and so forth) which are not shown.

Microprocessor 11, chipset 12 and cache memory chips 13 may be mounted to printed circuit board 10, for example, by surface mount connection, or by another well known device mounting method. In the example of FIG. 3, microprocessor 11 and system controller 25 are ball grid array (BOA) type devices that are surface mounted to top side 18 of printed circuit board 10. Also as shown in FIG. 3, system controller 25 is mounted in close proximity to microprocessor 11, such that heat generated by microprocessor 11 may be "coupled" to system controller 25, causing the overall increase in the temperature of system controller 25.

Heat sink 14 may be coupled only to microprocessor 11, or (as shown in FIG. 3) may be coupled to both microprocessor 11 and system controller 25 in order to increase heat dissipation between the two devices. Heat sink 14 may take any well known form for such heat sinking devices, and thus the actual size and shape of the heat sink 14 used with the exemplary microprocessor module may differ from that depicted in FIG. 3 for illustrative purposes.

Exemplary microprocessor 11 contains a heat sensing element 15 internal to microprocessor 11 (illustrated as a cutaway portion in FIG. 3) that provides an indication of the temperature of microprocessor 11. Microprocessors including such heat sensing elements include the PENTIUM®-ID microprocessors sold by Intel Corporation of Santa Clara, Calif. In the present example, heat sensing element 15 comprises a diode-type element.

Figure 4:
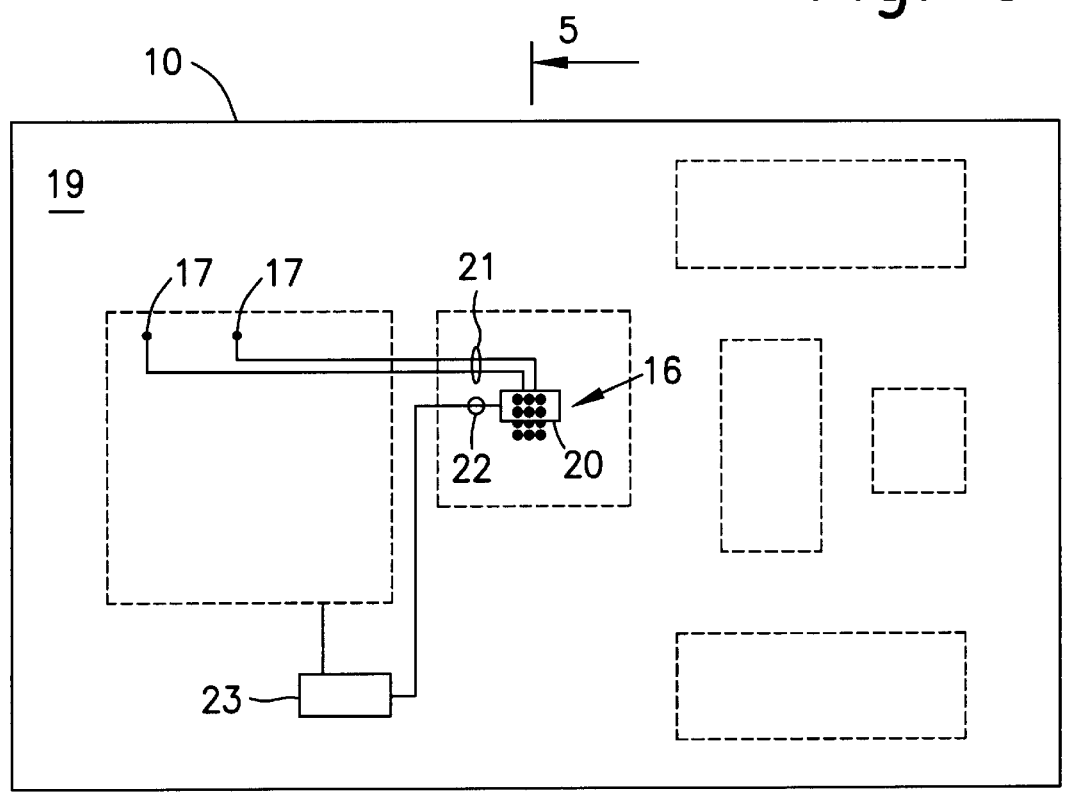
FIG. 4 shows a bottom side view of the microprocessor module of FIG. 3, according to the present invention.
Figure 5:
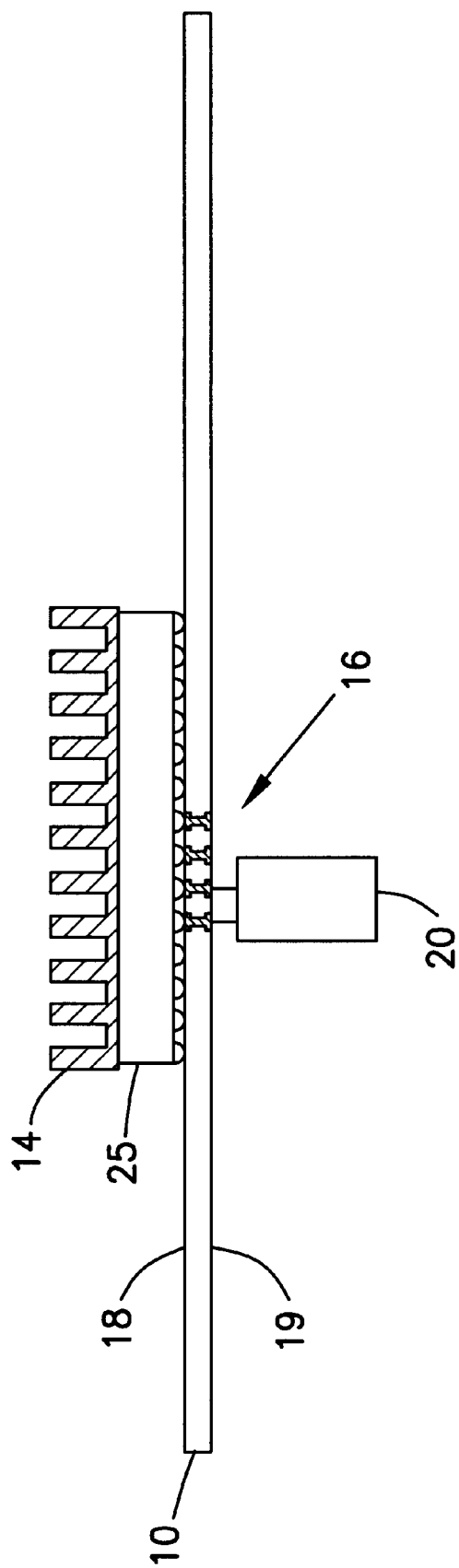
FIG. 5 shows a cross-sectional view of the microprocessor module of FIG. 4 along the line 5—5, according to the present invention.

FIG. 4 shows a view of a bottom side 19 of the printed circuit board 10 for the exemplary microprocessor module of FIG. 3. The dashed lines shown in FIG. 4 indicate the relative locations of the microprocessor 11, chipset 12 (including system controller 25) and cache chips 13, which are mounted on the top side 18 of the printed circuit board 10. Ground vias 16 are located in printed circuit board 10 to allow connection on bottom side 19 to electrical ground interconnections for system controller 25 of chipset 12, and signal vias 17 are located in printed circuit board 10 to allow electrical connection on bottom side 19 to interconnections for the heat sensing element 15 internal to microprocessor 11.

As shown in FIG. 4, a thermal sensor 20 is mounted on the bottom side 19 of printed circuit board 10. Thermal sensor 20 includes an "ambient" temperature sensing capability for measuring the temperature of devices through the monitoring of ground connections made to those devices. As shown in FIG. 4, thermal sensor 20 is thermally coupled to the ground vias 16 for the ground interconnections of system controller 25 (for example, by surface mounting using metallic solder compounds). FIG. 5, which shows a cross-sectional view of the microprocessor module, also illustrates the connection of thermal sensor 20 to the electrical ground connections for system controller 25.

Thermal sensor 20 further includes "remote" temperature sensing capability for measuring the temperature of remote devices in conjunction with heat sensing elements. Remote sensing connections 21 of thermal sensor 20 are electrically connected to signal vias 17 in order to electrically couple with the heat sensing element 15 internal to microprocessor 11. Thermal sensors of this type are sold by, for example, Analog Devices Corp. of Norwood, Mass., and Maxim Corp. of Santa Clara, Calif.

Thermal sensor 20 further includes at least one thermal signal output 22, which is provided to a thermal control system 23 (which may comprise, for example, a microcontroller). Thermal control system 23 may be configured to respond to temperature conditions sensed at one or both of the microprocessor 11 and chipset 12 as indicated by the thermal sensor 20. For example, the thermal control system 23 may be configured to reduce system clock frequency (clock throttling) in response to a temperature condition that exceeds a threshold temperature, or may be configured to shut down the system completely.

It should be noted that the ambient temperature sensing capability for exemplary thermal sensor 20 is more accurate when closely coupled to the ground connection of the device to be measured. Thus, the placement of the thermal sensor 20 on the bottom side 19 of printed circuit board 10 facilitates the accurate temperature measurement of system controller 25, which, in this example, has its ground interconnections located in the center portion of the device (see FIGS. 4 and 5). If the ground interconnections were located on the perimeter of the device, thermal sensor 20 could be located, for example, on the top side 18 of the printed circuit board 10 without excessive loss of measurement accuracy.

It should be further noted that the ambient temperature sensing capabilities of thermal sensor 20 can be applied to other devices mounted to printed circuit board 10, should temperature sensing become more critical for such devices. For example, the thermal sensor 20 may be located proximate to one of the cache memory chips 13 or another of the devices of chipset 12, if measurement of the temperature of these chips is desired.

The exemplary embodiment according to the present invention has been implemented by Intel Corporation, for example, as part of its mobile PENTIUM®-ID microprocessor module. This implementation includes a PENTIUM®-ID microprocessor, a 440BX system control chipset and at least one cache memory device on a single printed circuit board for use, for example, in mobile computing applications (e.g., notebook computers). This implementation also includes a Maxim MAX1617 thermal sensor device for use in both ambient thermal sensing and remote thermal sensing. The exemplary embodiment according to the present invention is useful for mobile computing applications due to the space constraints involved and close proximity of each electronic device.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A thermal sensing system, comprising:

a first integrated circuit device having a heat sensing element;

a second integrated circuit device; and a thermal sensor thermally coupled to the second integrated circuit device to measure the temperature of the second integrated circuit device, and electrically coupled to the heat sensing element to measure the temperature of the first integrated circuit device.

2. The system of claim 1, wherein the first integrated circuit device is a microprocessor.

3. The system of claim 1, wherein the first integrated circuit device, second integrated circuit device and thermal sensor are mounted on a printed circuit board.

4. The system of claim 3, wherein the first integrated circuit device and second integrated circuit device are mounted on a first side of the printed circuit board, and the thermal sensor is mounted on a second side of the printed circuit board.

5. The system of claim 1, further comprising a thermal control system coupled to the thermal sensor to receive temperature indications from the thermal sensor.

6. The system of claim 5, wherein the thermal control system produces control signals representing at least one of a system clock slowdown, a low power operation mode, or a system shutdown, based on the temperature indications.

7. The system of claim 6, wherein the control signals are generated when the temperature of at least one of the first integrated circuit device and the second integrated circuit device reaches a threshold temperature.

8. The system of claim 6, wherein the thermal control system is coupled to the first integrated circuit device to provide the control signals.

9. The system of claim 7, wherein the control signals are generated when the temperature of at least one of the first integrated circuit device and the second integrated circuit device reaches a threshold temperature.

10. The system of claim 1, wherein the thermal sensor is thermally coupled to the second integrated circuit device by soldering the thermal sensor to at least one ground connection of the second integrated circuit device.

11. The system of claim 10, wherein the thermal sensor is thermally coupled to the second integrated circuit device by soldering the thermal sensor to at least one ground via, the at least one ground via thermally coupled to the at least one ground connection of the second integrated circuit device.

12. The system of claim 1, wherein the thermal sensor is mounted proximate to the second integrated circuit device to obtain an accurate temperature measurement for the second integrated circuit device.

13. The system of claim 1, wherein the heat sensing element is integrated into the first integrated circuit device.

14. The system of claim 1, wherein the first integrated circuit device is located in close proximity to the second integrated circuit device such that heat generated by the first integrated circuit device increases the temperature of the second integrated circuit device.

15. A microprocessor module, comprising:

a board;

a microprocessor having a heat sensing element and mounted on a first side of the board;

a chipset including a system controller device, the chipset mounted on the first side of the board; and a thermal sensor mounted on a second side of the board, the thermal sensor thermally coupled to the system controller device through ground interconnections of the system controller and electrically coupled to the heat sensing element.

16. The microprocessor module of claim 15, further comprising a thermal control system coupled to the thermal sensor and the microprocessor, wherein the thermal sensor provides temperature indications to the thermal control system and the thermal control system provides control signals to the microprocessor.

17. The microprocessor module of claim 16, wherein the control signals comprise at least one of a low-power operation signal, a system clock slowdown signal, and a system shutdown signal.

18. The microprocessor module of claim 16, wherein the control signals are generated when the temperature of at least one of the microprocessor and system controller reaches a threshold temperature.

19. A mobile microprocessor module, comprising, a printed circuit board;

a microprocessor mounted on a first side of the printed circuit board and having a heat-sensing diode;

a heat sink coupled at least to the microprocessor;

a chipset including a system controller device mounted on the first side of the printed circuit board, the system controller having at least one ground interconnection coupled to a respective at least one ground via in the printed circuit board;

at least one cache memory; and a thermal sensor mounted on a second side of the printed circuit board and opposite the system controller, the thermal sensor thermally coupled to the at least one ground via and electrically coupled to the heat-sensing diode.

20. The module of claim 19, wherein the microprocessor and the system controller are mounted in close proximity to each other such that heat generated by the microprocessor causes a temperature of the system controller to increase.

* * * * *